United States Patent Office 3,108,974
Patented Oct. 29, 1963

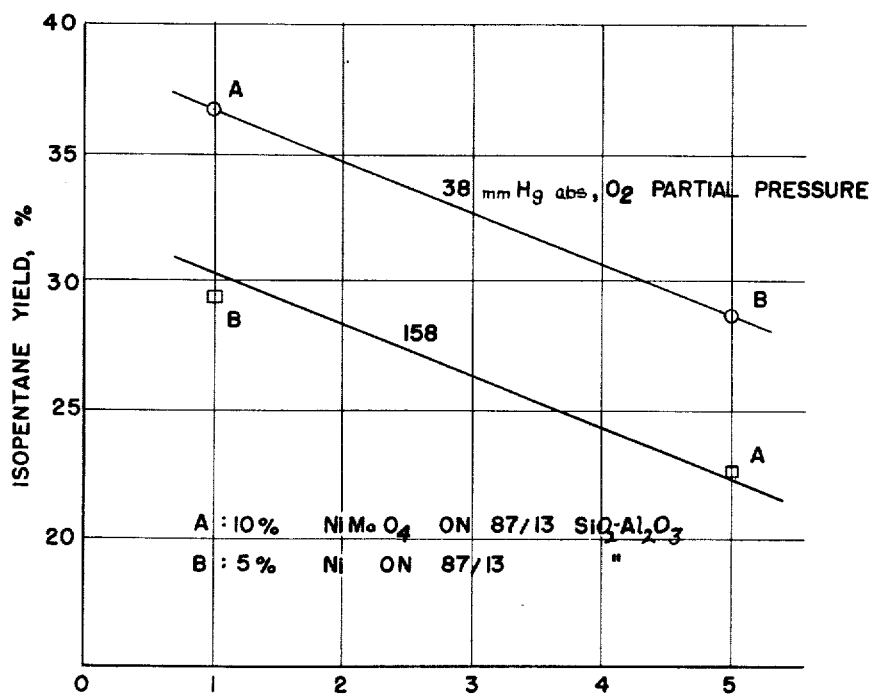

3,108,974
ACTIVATION OF ISOMERIZATION CATALYSTS BY SEQUENTIAL OXIDATION AND REDUCTION
Norman L. Carr, Crystal Lake, Ill., assignor to The Pure Oil Company, Chicago, Ill., a corporation of Ohio
Filed Nov. 29, 1957, Ser. No. 699,622
7 Claims. (Cl. 252—455)

This invention relates to a method of hydroisomerizing low-molecular-weight hydrocarbons and more particularly to a method for hydroisomerizing normal paraffinic hydrocarbons having 4 to 7 carbon atoms in the molecule.

Low-molecular-weight, normal paraffinic hydrocarbons having 4 to 7 carbon atoms, and particularly normal pentane and hexane, can be isomerized to branch-chain paraffins by contact with solid catalysts at temperatures of the order of 650 to 800° F. and elevated pressures of the order of 200 to 1000 pounds per square inch. Catalysts which are effective in selectively converting normal paraffins to isoparaffins are composed of an acidic silica-alumina cracking catalyst as support, impregnated with a small amount of a Group VIII metal, such as nickel, platinum, palladium, iridium and rhodium, or combinations thereof. Although nickel supported on a silica-alumina cracking catalyst is an effective isomerization catalyst, its selectivity is improved when incorporated in the form of nickel molybdate. In the decomposition (activation) of metal-oxygen compounds, such as nickel-molybdate, the metal oxide is usually produced, and then is subsequently reduced in the presence of hydrogen at elevated temperatures. It is possible that reduction of the metal oxide is not the only criterion for activity; activating reactions such as the breaking of metal-support complexes and hydrogen chemisorption also occur and are affected by time and temperature.

Isomerization catalysts are prepared in active state by a process of oxidation with a substantially dry, oxygen-containing gas, preferably gas having a water vapor partial pressure below 15 mm. of mercury, followed by reduction with hydrogen-containing gas. The activity of the catalyst is dependent on a careful control of the oxidation and reduction conditions. For example, in the case of nickel and nickel molybdate supported catalysts, it is important to maintain the partial pressure of water vapor in the reducing gas not higher than about 25 mm. of mercury in order to obtain maximum activity. Likewise, the water vapor partial pressure in the conditioning of noble metal catalysts is important, best results being obtained if the partial pressure of water vapor in the reducing gas is maintained at a low level, preferably below 15 mm. of mercury.

This invention is directed primarily to the discovery that in order to obtain a desired level of activity the time required for reduction of the catalyst during activation thereof is a function of catalyst composition, the oxidation temperature and time, partial pressure of oxygen in the oxygen atmosphere during the oxidation step in the catalyst conditioning, and the composition of the catalyst. This function can be defined by the expression $Y = AXZ$, in which Y is the minimum reduction time in hours; A is a constant that is dependent upon catalyst composition, oxidation temperature, and reduction temperature and pressure; X is the time in hours of the oxidation period; and Z is the partial pressure (in millimeters of mercury) of oxygen in the oxidizing atmosphere.

An object of this invention is to provide an improved method for the hydroisomerization of normal hydrocarbons. A further object of the invention is to provide an improved method for conditioning solid hydroisomerization catalysts. Another object of the invention is to provide an improved method for activating solid hydroisomerization catalysts composed of a hydrogenation component supported on an acidic cracking support. Still another object of the invention is to provide a method for regeneration of hydroisomerization catalysts composed of a hydrogenation component supported on an acidic cracking catalyst. A further object of the invention is to provide a method for increasing the octane number of hydrocarbons for use in internal combustion engine fuel.

Other objects of the invention will become manifest from the following description and the accompanying drawing, of which the single figure is a graph showing the effect of oxidation time and oxygen partial pressure on the activity of two different catalysts.

I have found that in order to initially condition a catalyst, or to regenerate a catalyst to its maximum activity, the catalyst must be subjected to a hydrogen-reducing atmosphere in the substantial absence of oxygen and water vapor for a minimum period of time defined by the aforesaid equation. If the catalyst is not subjected to the reducing atmosphere for a minimum time determined by the equation, the activity of the catalyst will be less than the maximum. This can be readily demonstrated by reference to the drawing, which shows the activity of two catalysts, one designated as "A" being composed of 10% by weight of nickel molybdate on a cracking catalyst composed of 87% silica and 13% alumina, and the other, designated "B" being composed of 5% nickel on the same cracking catalyst.

A portion of each catalyst after having been formed was subjected to oxidation for a period of 1 hour and another portion was oxidized for 5 hours at a temperature of 975° F., using as the oxidation atmosphere a nitrogen-oxygen mixture having an oxygen partial pressure of 38 or 158 mm. of mercury and a water vapor partial pressure of about 15 mm. of mercury. In conditioning the catalyst for subsequent use in the isomerization of normal pentane, the catalyst was submitted to controlled oxidation at a bed temperature of 700° F. until localized temperature rises subsided, and then was rapidly heated to 975° F. and held at this temperature for the desired oxygen partial pressure for the specified time. The reduction was then effected by admitting hydrogen at 900° F., and thereafter holding the bed temperature of the catalyst at 975° F. for 2 hours in a stream of hydrogen containing water at a partial pressure of 25 mm. of mercury, absolute.

The two catalysts which had been conditioned as set forth above were then used in the isomerization of normal pentane at 700° F., a pressure of 500 pounds per square inch with a liquid weight hourly space velocity of 2.3, and a hydrogen-to-hydrocarbon ratio of 0.5. The results of the four runs are given in the following Table I.

TABLE I

| Run | Catalyst | Conv., wt. percent | Yield, wt. percent | Selectivity (percent) | O₂ Partial Pressure (mm. Hg) | Oxidation Time (hours) | Relative Activity Ratio [1] |
|---|---|---|---|---|---|---|---|
| 1 | A | 42.2 | 36.4 | 86.3 | 38 | 1 | 0.91 |
| 2 | A | 32.6 | 28.2 | 86.5 | 38 | 5 | 0.65 |
| 4 | B | 34.3 | 29.5 | 86 | 158 | 1 | 0.58 |
| 4 | A | 25.4 | 22.4 | 88 | 158 | 5 | 0.43 |

Catalyst A—10% NiMoO₄ on 87% w. alumina support.
Catalyst B—5% Ni on 87% w. silica and 13% w. alumina support.
Feed was technical grade n-pentane in all runs.
[1] "Relative Activity Ratio" is the activity of the particular catalyst in the particular run compared with the activity of 10% nickel molybdate on 87/13 silica, alumina support in the isomerization of n-pentane to isopentane at 700° F., hydrogen-to-hydrocarbon ratio of 1, LWHSV=2.6 LVHSV=3.3, and pressure of 500 p.s.i.g. A yield of 40 wt. percent isopentane is obtained under these conditions and the catalyst is considered to have a relative activity of 1.

From Table I it will be seen that the yield (percent of pentane converted to isopentane) diminished by about 2% units for each additional hour of oxidation, and by about 6% units when the oxidation partial pressure was increased from 38 to 158 mm. of mercury. In terms of activity, which is proportional to the catalytic reaction rate, the effect of increasing the oxidation time at constant oxygen pressure is to decrease activity by 6.9% per hour; the effect of increasing the oxygen partial pressure at constant time is to decrease activity by 0.3% per partial pressure (in mm.) increase. Therefore, it is important to keep the oxidation time and oxygen partial pressure at a minimum when the over-all regeneration time (including reduction) is limited.

By plotting these results for each catalyst with isopentane yield as ordinates and time in oxygen at 975° F. as abscissae, it will be seen that the trend for both catalysts is substantially identical.

From the other data and the diagram, it has been determined that the value for the constant A for maximum activity of the particular catalysts tested is 0.07. Using this value and substituting it in the equation $Y=AXZ$, it can be determined that under the conditions of oxidation used in conditioning the catalyst, namely, 975° F., time of two hours and an oxidation partial pressure of 158 mm. of mercury, the reduction time (Y) required to attain full catalyst activity is about 22 hours. In this case, Y is the approximate minimum reduction time, and the results are derived over the following ranges of conditions:

$$0<Y<30$$
$$0<X<5$$
$$30<Z<180$$

At conditions of X, Y, and Z beyond the ranges of the data, the expression should be used as a guide.

The constant A can similarly be determined for the level of activity reached in runs 1–4, inclusive, by substituting the known values for Y, X, and Z as follows:

| Run | Relative Activity | Value of X | Value of Y | Value of Z | $A=Y/XZ$ |
|---|---|---|---|---|---|
| 1 | .91 | 1 | 2 | 38 | .053 |
| 2 | .65 | 5 | 2 | 38 | .011 |
| 3 | .58 | 1 | 2 | 158 | .013 |
| 4 | .43 | 5 | 2 | 158 | .0025 |

As previously mentioned, the invention is applicable to hydroisomerization over catalysts composed of a hydrogenation component carried on a solid, acidic, silica-alumina support. Illustrative of catalyst which are useful in my invention and which can be conditioned in accordance therewith are catalysts composed of about 1–5% of nickel on silica-alumina containing from about 5–50% of alumina; nickel molybdate, supported catalysts composited by depositing from about 2–10% of nickel molybdate on silica-alumina cracking catalyst containing from 5–50% of alumina; noble metal catalysts containing from about 0.1–1% of platinum, palladium or rhodium, and mixtures thereof, supported on a silica-alumina cracking catalyst as, for example, a silica-alumina catalyst containing 87% of silica and 13% of alumina by weight, or one containing 75% of silica and 25% of alumina by weight; or, the catalyst may be a combination of noble metal and non-noble metal of group VIII of the periodic table supported on a silica-alumina cracking catalyst base.

These catalysts are prepared in conventional manner as, for example, by impregnating the support with a solution of a nickel salt, such as sulfate, acetate, chloride, nitrate, or complex nickel-ammonium compound in the case of the nickel catalyst. In the case of the nickel molybdate catalyst, a solution of nickel molybdate is used to impregnate the solid acidic support. In the case of the noble metals, such as platinum, a chloroplatinate or a chloroplatinic solution is used to impregnate the support. In the case of palladium, an ammonium chloropalladite solution or palladium chloride dihydrate in hydrochloric acid solution may be used. After impregnation, the catalysts are generally dried at temperatures of around 250–400° F., after which they are subjected to the conditioning treatment hereinbefore described.

Although other solid, hydrocarbon-cracking catalysts may be used as supports, such as silica-zirconia, silica-titania, silica-boria, alumina-zirconia, alumina-beryllia, alumina-boria, silica-chromia, boria-titania, silica-alumina-zirconia, silica-alumina-beryllia, and acid-treated clays, I prefer to use silica-alumina cracking catalysts since they appear to give the greatest activity.

In carrying out the conditioning or regeneration of the isomerization catalyst, oxidation temperature should be above about 750° F., but not above 1000° F. Below 750° F. there is danger of not effectively oxidizing the undesirable substances in the catalyst, and above 1000° F. there is danger of destroying the structure of the catalyst and permanently injuring it. The same is true for the reduction step. Within these ranges for the nickel- and nickel molybdate-promoted silica-alumina, acidic-base catalyst, the constant A of 0.07 is valid. This constant will change for other catalysts but can be readily determined by performing a series of experiments based on a Latin square pattern and drawing a graph similar to the figure herein, from which the constant can be determined.

Specific examples of other catalyst to which the invention is applicable are 10% nickel molybdate on 50/50 silica-alumina, 15% nickel molybdate on 50/50 silica-alumina, 10% nickel molybdate on 75/25 silica-alumina, 0.4% palladium on 75/25 silica-alumina, 1% palladium on 75/25 silica-alumina, 2% palladium on 75/25 silica-alumina, 6% palladium on 75/25 silica-alumina, the same amounts of palladium on 87/13 silica-alumina, 0.2% rhodium on 75/25 silica-alumina, 0.4% palladium and 0.1% rhodium on 75/25 silica-alumina, and 0.6% platinum on 75/25 silica-alumina.

The following specific examples will illustrate the activity of these catalysts when activated or conditioned in accordance with my invention.

*Example I*

A charge consisting by weight of approximately 45% of pentane, 41% of hexane, 10% of cyclohexane and the balance of other low-boiling hydrocarbons, was isomerized over a catalyst made by impregnating 50/50 silica-alumina with 10% nickel molybdate. The reaction temperature was 698° F., pressure 350 p.s.i., liquid volume hourly space velocity 1.0, and hydrogen-to-hydrocarbon ratio 2.3. There was obtained a conversion of 59.7% of normal paraffins to isoparaffins with a selectivity of 93.9 and a yield of 56%.

*Example II*

A charge composed by weight of 40% pentane, 44% hexane, 11% cyclohexane and the balance of other low-boiling hydrocarbons, was contacted with a catalst made by impregnating 50/50 silica-alumina with 15% nickel molybdate at a reaction temperature of 660° F., pressure of 350 p.s.i., and liquid volume hourly space velocity of 1.0, and a hydrogen-to-hydrocarbon ratio of 2.0. A conversion of 43.8% of normal paraffins to isoparaffins was obtained with a selectivity of 91.2% and a yield of 40%.

*Example III*

Normal pentane was isomerized at a temperature of 690–700° F., at a liquid volume hourly space velocity of 2 to 3, and a hydrogen-to-hydrocarbon ratio of approximately 1, over a catalyst containing 3% nickel on 75/25 silica-alumina. By weight, 33.5% of the pentane was converted to isopentane at a selectivity of 96.9%. Under the same conditions, with a catalyst composed of 3% nickel on 87/13 silica-alumina, a conversion of 41.8% was obtained at a selectivity of 92.8%.

Example IV

Normal pentane was contacted with a catalyst composed of 0.4% palladium on 87% by weight of silica and 13% alumina at a liquid volume hourly space velocity of 1.9, a hydrogen-to-hydrocarbon mol ratio of 1.8, a temperature of 717° F. and a pressure of 395 p.s.i. Conversion of 58.4% of the pentane was effected at a selectivity of 98.4%.

Example V

Normal hexane was isomerized in the presence of a catalyst composed of 0.4% palladium on 75/25 silica-alumina at reaction conditions of temperature 724° F., pressure 630 p.s.i., liquid volume hourly space velocity of 3.0, and hydrogen-to-hydrocarbon mol ratio of 3.0. Conversion was 70.2% by weight with a selectivity of 97%. With the same catalyst and at a temperature of 700° F., pressure of 700 p.s.i., liquid volume hourly space velocity of 2, and hydrogen-to-hydrocarbon mol ratio of 2, conversion was 74.3% with a selectivity of 95.4%.

Example VI

A mixture of 60% of normal pentane, 30% of normal hexane and 10% of cyclohexane was isomerized over a catalyst composed of 0.4% palladium on 75/25 silica-alumina, at a temperature of 725° F., pressure of 700 p.s.i., hydrogen-to-hydrocarbon mol ratio of 2.2 and liquid volume hourly space velocity of 1.9. Conversion of 51% of the n-$C_5$ was obtained with a selectivity of 102.4%, 73% of the n-$C_6$ with a selectivity of 98.6%, and 88.2% of the cyclohexane with a selectivity of 73.3%. The 102.4% selectivity for n-$C_5$ is due to the fact that some of the hexanes formed isopentane.

In general, the isomerization is carried out at temperatures between 650–800° F. and pressures of 150–1000 p.s.i., with space velocities of approximately 1 to 5, and hydrogen-to-hydrocarbon mol ratios of approximately 0.5 to 4. In the case of nickel molybdate catalyst, temperatures are preferably in the lower range in order to avoid hydrocracking. The temperatures will also be in the lower range for $C_6$ and $C_7$ hydrocarbons. Where a mixture of hydrocarbons, such as a mixture of n-$C_5$ and n-$C_6$ hydrocarbons, is used as the charging stock, it is preferable to operate in an intermediate range in order to obtain maximum isomerization without an undue amount of hydrocracking. The following Table II illustrates the effectiveness of operating at a higher temperature level within the isomerization temperature range when isomerizing normal pentane.

TABLE II

Isomerization of n-pentane 500 p.s.i., 3 LVHSV, $H_2$:Hc ratio of 1:1

| Catalyst | | Percent wt. Yield | | Selectivity, Percent | |
|---|---|---|---|---|---|
| Promoter | Support | at 700° F. | at 750° F. | at 700° F. | at 750° F. |
| 0.1% Pd | 75:25 $SiO_2$—$Al_2O_3$ | 13.6 | 27.0 | 96.5 | 95 |
| 0.2% Pd | 75:25 $SiO_2$—$Al_2O_3$ | 35.2 | 51.4 | 98.0 | 96 |
| 0.4% Pd | 75:25 $SiO_2$—$Al_2O_3$ | 37.2 | 54.7 | 99.0 | 98 |
| 0.6% Pd | 75:25 $SiO_2$—$Al_2O_3$ | 46.0 | 60.0 | 99.5 | 98 |
| 0.2% Pd | 87:13 $SiO_2$—$Al_2O_3$ | 37.5 | 53.8 | 98.0 | 97.5 |
| 0.4% Pd | 87:13 $SiO_2$—$Al_2O_3$ | 42.9 | 59.8 | 98.5 | 97 |
| 0.1% Rd | 75:25 $SiO_2$—$Al_2O_3$ | 29.8 | 41.5 | 96 | 91 |
| 0.2% Rd | 75:25 $SiO_2$—$Al_2O_3$ | 33.0 | 52.8 | 99 | 98 |
| 0.4% Pd / 0.1% Rh | 75:25 $SiO_2$—$Al_2O_3$ | 45.4 | 59.8 | 99 | 98 |
| 0.6% Pt | 75:25 $SiO_2$—$Al_2O_3$ | 27.9 | 44.5 | 98.5 | 96.5 |

By a comparison of the figures for 700° F. and 750° F. operation, it will be seen that the conversion to isopentane is considerably higher at the higher temperature without any large effect on the selectivity of the reaction.

It will be seen that I have discovered a method of insuring the maximum activity of a hydroisomerization catalyst by correlating the hydrogen reduction step during the conditioning of the catalyst with the oxidation conditioning step.

This application is a continuation in part of patent application Serial No. 619,376, filed October 31, 1956, now Patent 2,917,565, issued December 15, 1959, which was a continuation in part of patent application Serial No. 551,854, filed December 8, 1955, now abandoned.

I claim as my invention:

1. In a process for the activation of an isomerization catalyst comprising a small amount of a hydrogenation component selected from the group consisting of nickel and nickel molybdate, supported on a solid, acidic, mixed oxides, hydrocarbon cracking catalyst, the steps of oxidizing said catalyst with substantially dry, oxygen-containing gas at a temperature between approximately 750° F. and 1000° F. for a period of time sufficient to convert the hydrogenation component to the oxide form and thereafter reducing said catalyst in a substantially oxygen-free and water-free hydrogen-containing atmosphere at a temperature of 750° F. to 1000° F. for a minimum period of time determined by the equation, $$Y = 0.07XZ$$

in which Y is the minimum reduction time in hours, X is the length of the oxidation period in hours, and Z is the partial pressure of oxygen in the oxygen-containing gas in millimeters of mercury.

2. The process in accordance with claim 1 in which the catalyst is nickel supported on silica-alumina.

3. The process in accordance with claim 2 in which the catalyst is 1 to 5% by weight of nickel supported on a high-silica-content silica-alumina support.

4. The process in accordance with claim 1 in which the catalyst is composited by impregnating a silica-alumina support with nickel molybdate.

5. The process in accordance with claim 1 in which the catalyst is composited by impregnating a silica-alumina support containing approximately 87% by weight of silica and 13% by weight of alumina with about 10% by weight of nickel molybdate.

6. The process in accordance with claim 3 in which X is 1 to 5 hours, Z is 38–160 millimeters of mercury, and the oxidizing and reducing steps are conducted at a temperature of about 975° F.

7. The process in accordance with claim 5 in which X is 1 to 5 hours, Z is 38–160 millimeters of mercury, and the oxidizing and reducing steps are conducted at a temperature of about 975° F.

References Cited in the file of this patent

UNITED STATES PATENTS

| | | |
|---|---|---|
| 1,159,480 | Ellis | Nov. 9, 1915 |
| 1,238,137 | Hagemann | Aug. 28, 1917 |
| 2,452,190 | Hetzel | Oct. 26, 1948 |
| 2,888,501 | Folkins et al. | May 26, 1959 |
| 2,917,565 | Carr | Dec. 15, 1959 |
| 2,968,631 | Carr et al. | Jan. 17, 1961 |

FOREIGN PATENTS

| | | |
|---|---|---|
| 487,392 | Canada | Oct. 21, 1952 |

UNITED STATES PATENT OFFICE
CERTIFICATE OF CORRECTION

Patent No. 3,108,974                                            October 29, 1963

Norman L. Carr

It is hereby certified that error appears in the above numbered patent requiring correction and that the said Letters Patent should read as corrected below.

Column 2, TABLE I, the third item under the heading "Run", for "4" read -- 3 --; the second item under the heading "Catalyst" for "A" read -- B --; the first footnote immediately following the table, for "NiMoO$^4$ on 87% w. alumina support" read -- NiMoO$_4$ on 87% w. silica and 13% w. alumina support --; column 4, line 56, for "catalst" read -- catalyst --; column 5, TABLE II, under the heading "Promoter", seventh item, for "0.1% Rd" read -- 0.1% Rh --; same table, under the same heading, eighth item, for "0.2% Rd" read -- 0.2% Rh --.

Signed and sealed this 19th day of May 1964.

(SEAL)
Attest:

ERNEST W. SWIDER                                            EDWARD J. BRENNER
Attesting Officer                                                 Commissioner of Patents